(12) United States Patent
Seed et al.

(10) Patent No.: US 9,079,789 B2
(45) Date of Patent: Jul. 14, 2015

(54) FLOWPATHS IN CDI CELL

(75) Inventors: Leonard Paul Seed, Guelph (CA); Iurie Pargaru, Guelph (CA); Gene Sidney Shelp, Guelph (CA)

(73) Assignee: ENPAR TECHNOLOGIES INC., Guelph, Ontario (CA)

( * ) Notice: Subject to any disclaimer, the term of this patent is extended or adjusted under 35 U.S.C. 154(b) by 87 days.

(21) Appl. No.: 14/115,742

(22) PCT Filed: May 11, 2012

(86) PCT No.: PCT/CA2012/000454
§ 371 (c)(1),
(2), (4) Date: Nov. 5, 2013

(87) PCT Pub. No.: WO2012/151686
PCT Pub. Date: Nov. 15, 2012

(65) Prior Publication Data
US 2014/0069814 A1    Mar. 13, 2014

(30) Foreign Application Priority Data
May 11, 2011 (GB) .................................. 1107841.7

(51) Int. Cl.
*C02F 1/46* (2006.01)
*C02F 1/469* (2006.01)
*C02F 103/08* (2006.01)

(52) U.S. Cl.
CPC ........... *C02F 1/4691* (2013.01); *C02F 2103/08* (2013.01); *C02F 2201/4611* (2013.01)

(58) Field of Classification Search
CPC ........... C02F 1/4691; C02F 2201/4611; C02F 2103/08
USPC .................................................. 204/554, 674
See application file for complete search history.

(56) References Cited

U.S. PATENT DOCUMENTS

| | | |
|---|---|---|
| 5,425,858 A | 6/1995 | Farmer |
| 6,761,809 B2 | 7/2004 | Tran et al. |
| 7,706,128 B2 | 4/2010 | Bourcier |
| 7,903,388 B2 | 3/2011 | Roswech et al. |
| 2008/0073288 A1* | 3/2008 | Fan et al. ...................... 210/748 |
| 2011/0240472 A1 | 10/2011 | Seed et al. |

* cited by examiner

*Primary Examiner* — Arun S Phasge
(74) *Attorney, Agent, or Firm* — Anthony Asquith Corp.

(57) ABSTRACT

In a capacitive deionization water desalination apparatus, the waterways of the cell are physically switchable between treatment-phase and purge-phase. In treatment-phase, the waterways conduct the flow of water thickness-wise, in-series, through the whole stack of electrodes and spacers. In purge-phase, the waterways conduct the flow of purge-water into the edges of the spacers, and along the spacers parallel to the plane of the spacers.

14 Claims, 4 Drawing Sheets

FLOWPATHS IN CDI CELL

This specification relates to capacitive deionization (CDI) of water, for example the desalination of salt water, and is a development of the technologies shown in patent publications WO-2010/069,052 and WO-2010/069,065.

Capacitive deionization is used e.g for desalinating seawater, and other salty and brackish waters. CDI may be used also for deionizing water containing other dissolved salts.

The voltage at which CDI is carried out is below the threshold at which electrolysis of the salty water is triggered. CDI is effective to remove ions from the salty water at voltages that are below the electrolysis threshold, and the amount of energy needed to snag the ions, and adsorb them into the porous plates of the capacitors, is much less than the energy that would be consumed by electrolysis.

Some of the characteristics of CDI may be described as follows.

In a stack of electrodes and spacers, the power supply is connected to the electrodes to form alternating anode-cathode and cathode-anode pairs. The electrodes should be configured for monopolarity, i.e in respect of each anode, the next electrode immediately upstream, in the stack, is a cathode and the next electrode immediately downstream is a cathode; and in respect of each cathode, the next electrode immediately upstream, in the stack, is an anode and the next electrode immediately downstream is an anode.

Herein, the terms 'electrode', 'anode', 'cathode', are used to refer to the electrostatically-charged plates of the capacitors. The use of these terms should not be taken to suggest that electrolysis, or any electrolytic reaction, is associated with the electrodes.

In respect of each anode-cathode pair:
(a) capacitive-areas of the two electrodes lie in such close-spaced face-to-face overlapping relationship as to create a capacitance function, and to perform capacitive deionization of water passing through the capacitance-space of that pair;
(b) the capacitive-areas of the pair define a perimeter and a thickness of the capacitive-space of that pair;
(c) the capacitive-space is defined as to its thickness by the face-to-face separation distance of the pair of electrodes, which is defined by the thickness of the spacer therebetween;
(d) the capacitive-space is defined as to its perimeter in that, outside the perimeter of the capacitive-space, the electrodes are either curtailed, or the face-to-face separation distance between the electrodes is too large to support substantive capacitive function;
(e) the power supply is operable to convey electrical energy to the electrodes at a voltage that is:
  (i) high enough to create a substantive capacitive effect between the electrodes;
  (ii) high enough to remove ions from the water by electrostatic attraction, whereby the ions become sorbed into the electrodes; and
  (iii) low enough to avoid creating electrolytic redox reactions in water passing through the pair.

In the type of CDI operation with which the present technology is concerned, the water to be treated passes thickness-wise through the thickness of the electrodes and spacers—as was the case in the above-referenced patent publications.

CDI, in addition to the treatment-phase described above, involves a purge-phase, in which the ions that have been adsorbed from the water into the pores of the electrodes are purged into a flow of purge-water, and carried away for disposal, leaving the pores of the electrodes once more clear, and able to receive more ions.

In the purge-phase, the purge-water, having flushed through one of the electrodes, now contains concentrated salt. The saltwater being treated has a salt-content of between e.g one and fifty grams per kilogram of water. The salt-content of the treated saltwater, typically, is below half a gram per kg. The salt-content of the purge-water, having flushed through one of the electrodes, typically has at least twice the salt-content of the incoming saltwater—or, especially if the salt-content of the incoming water is low, considerably more.

It will be understood that, during the purge-phase, the salty water is not being treated; thus, purging represents downtime. The present technology provides a way of shortening the time taken to purge the CDI cells, and thus provides a way of maximizing the useful output of the cells.

SOME FEATURES OF THE INVENTION

In a CDI apparatus, the apparatus contains and defines waterways, through which the water to be treated is conducted through the stack of electrodes and spacers. In the kind of CDI apparatus with which the present technology is concerned, in the treatment-phase, the waterways conduct the treatment-water thickness-wise through the thicknesses of all the electrodes and spacers in the stack, one after the other, in series. The waterways are so structured that the water cannot inadvertently bypass any of the electrodes.

The present CDI apparatus has the capability to switch the waterways, as between the treatment-phase and the purge-phase.

It is recognized that running the highly-concentrated purge-water through all the electrodes, one after another, in series, is counter-efficient. In the present technology, with switchable waterways, as described herein, the purge-water is discarded after having flushed the ions from e.g just one electrode. This enables all the electrodes to be purged, down to a desired low salt-content, all at once, in parallel.

Thus, the purge time is very short, when compared with an apparatus in which the purge-water can only follow the same waterways as the treatment-water, through all the electrodes in series.

LIST OF THE DRAWINGS

Figure 1:
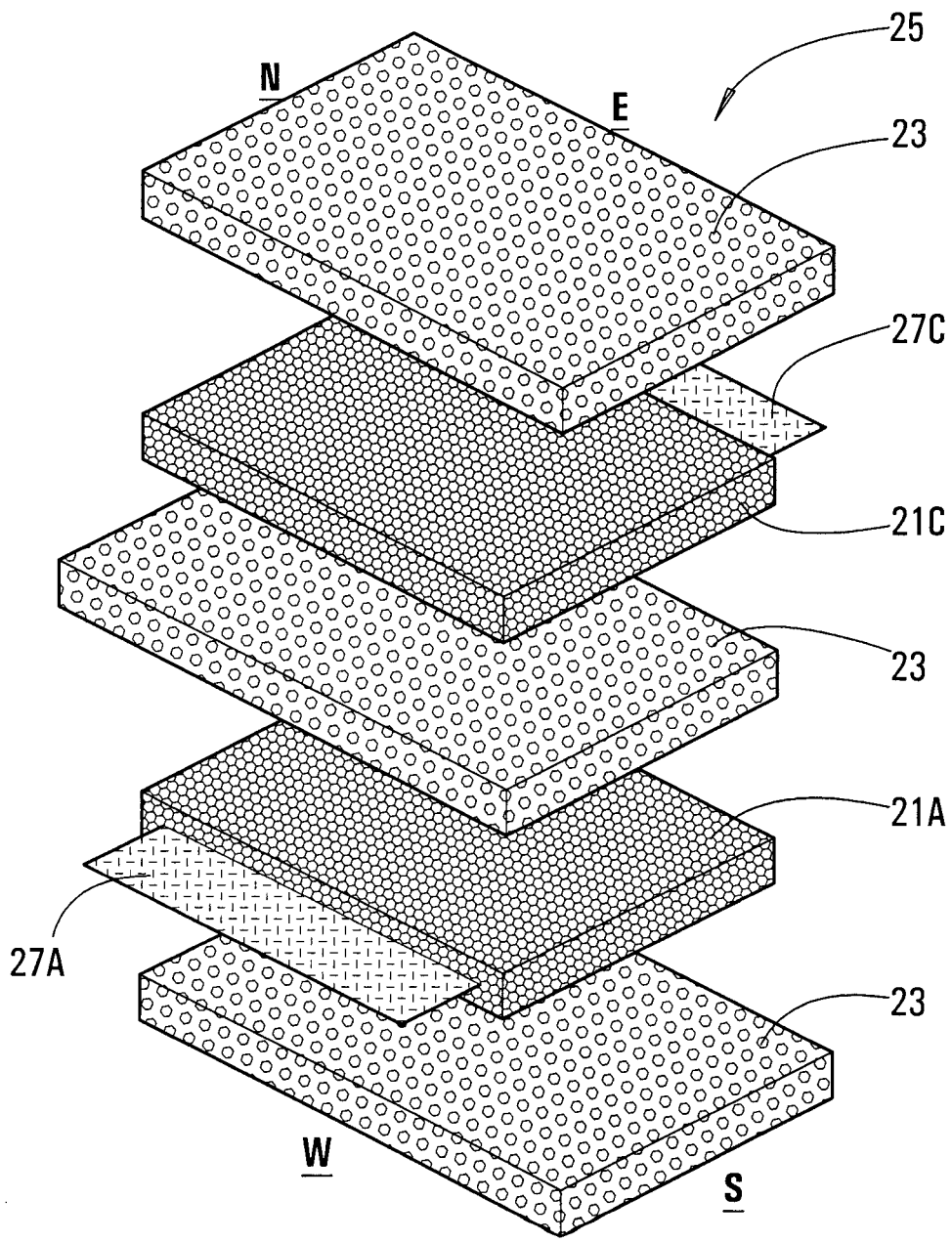
FIG. 1 is a pictorial view of electrode and spacer sheets. The sheets are arranged in a stack of sheets, in contact with each other, but are shown separated in FIG. 1

FIG. 1 shows a pair of electrodes 21, being an anode 21A and a cathode 21C. The electrodes are intercalated with spacers 23. The electrodes and spacers make up a stack 25, which contains typically hundreds of electrodes and spacers. The present technology is most advantageous when used with many electrodes; if the stack were to contain fewer than e.g ten electrodes, the problems addressed by the present technology become insignificant.

The electrodes 21 are thin sheets of electrically-conductive material. Preferably, the material is activated carbon, which is extremely porous, and has a very high surface area—being several hundred square metres per gram—as is desirable in the charge-plates of a capacitor. The sheets used in the CDI cells have a maximum thickness, typically, of 500 microns. (The drawings, of course, exaggerate the thicknesses of the sheets (electrodes and spacers).)

The spacers 23 are thin sheets of insulative, preferably hydrofilic, plastic, and are woven-mesh or are otherwise made highly permeable to the passage or flow of water—both in the direction through-the-thickness of the sheet, and in the direction along-the-plane of the sheet. The spacers should be so permeable as to offer only insignificant resistance to the through-flow of water in both those directions. (The activated-carbon electrodes 21 are significantly less permeable than the spacers 23.)

Embedded in the electrodes 21 are current collectors, 27A, 27C. Or, the collectors can be e.g glued onto the carbon sheets. The collectors 27 serve to even out the electrical properties of the activated-carbon sheets, the aim being for every point of the electrode to be at the same voltage, and to be passing the same current.

The activated-carbon sheets are significantly less conductive (have higher resistance) than the collectors. Also, often, the carbon sheets are non-homogeneous, electrically, to a not-insignificant degree, and the collectors help compensate for that.

The material of the current-collector should have good electrical conductivity, and should be inert with respect to the contents of the water being deionized. The current-collector can be formed as, for example, a woven mesh of titanium, or titanium-plated copper.

In the drawings, the edges of the (rectangular) sheets have been designated north, south, east, west. All the anode collectors 27A protrude from the west sides of their anodes 21A, and all the cathode collectors 27C protrude from the east sides of their cathodes 21C. The collectors 27 do not protrude out of the other edges of their electrodes.

Figure 2:
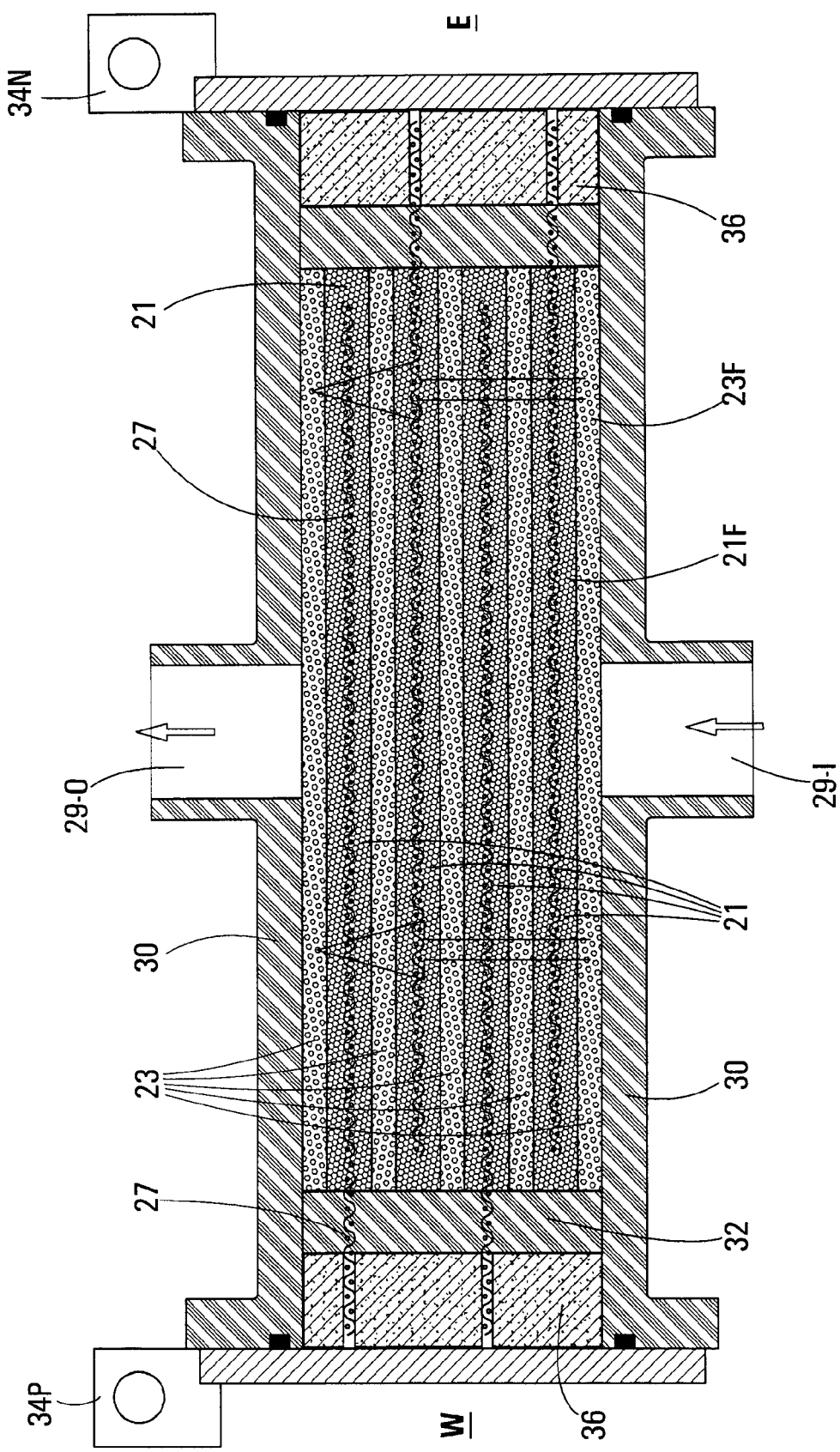
FIG. 2 is an east-west cross-sectional view of water treatment apparatus, in which the stack of electrodes and spacers is contained in a housing.

FIG. 2 shows a CDI cell apparatus, which has been arranged for extracting salt ions from seawater.

The stack 25 of electrodes 21 and spacers 23 is contained in a box or housing of insulative plastic. Seawater to be deionized enters the seawater-inlet-port 29, and enters the first spacer 23F of the stack. This first spacer 23F, which offers very little resistance to through-movement of water, serves as a seawater-inlet-plenum, in that the seawater, upon entering, immediately spreads out evenly (to left and right in FIG. 2) throughout the spacer 23F.

For present purposes, a 'plenum' is a chamber that is so configured that there are no gradients or differences in hydraulic head or pressure throughout the plenum (other than the gradient due to gravity). Thus, the hydraulic pressure of the seawater (created e.g by a pump located e.g upstream of the inlet-port) urging the seawater to pass into and through the thickness of the first electrode 21F, is substantially the same at all points on the surface of the first electrode 21F.

The housing 30 should be arranged to compress the stack (slightly) between the bottom and lid of the housing. Thus, the face-to-face separation distances apart of adjacent electrodes is the thickness of the respective spacers. There should be no crannies which might trap stationary water.

As shown in FIG. 2, the east and west edges of the electrodes and spacers are sealed. The sealing of the east and west edges can be done conveniently by potting the east and west edges of all electrodes and spacers with insulative plastic sealant material 32. Again, the sealing should be done in such manner that there is no pathway whereby the seawater could or might bypass any of the electrodes.

Figure 3:
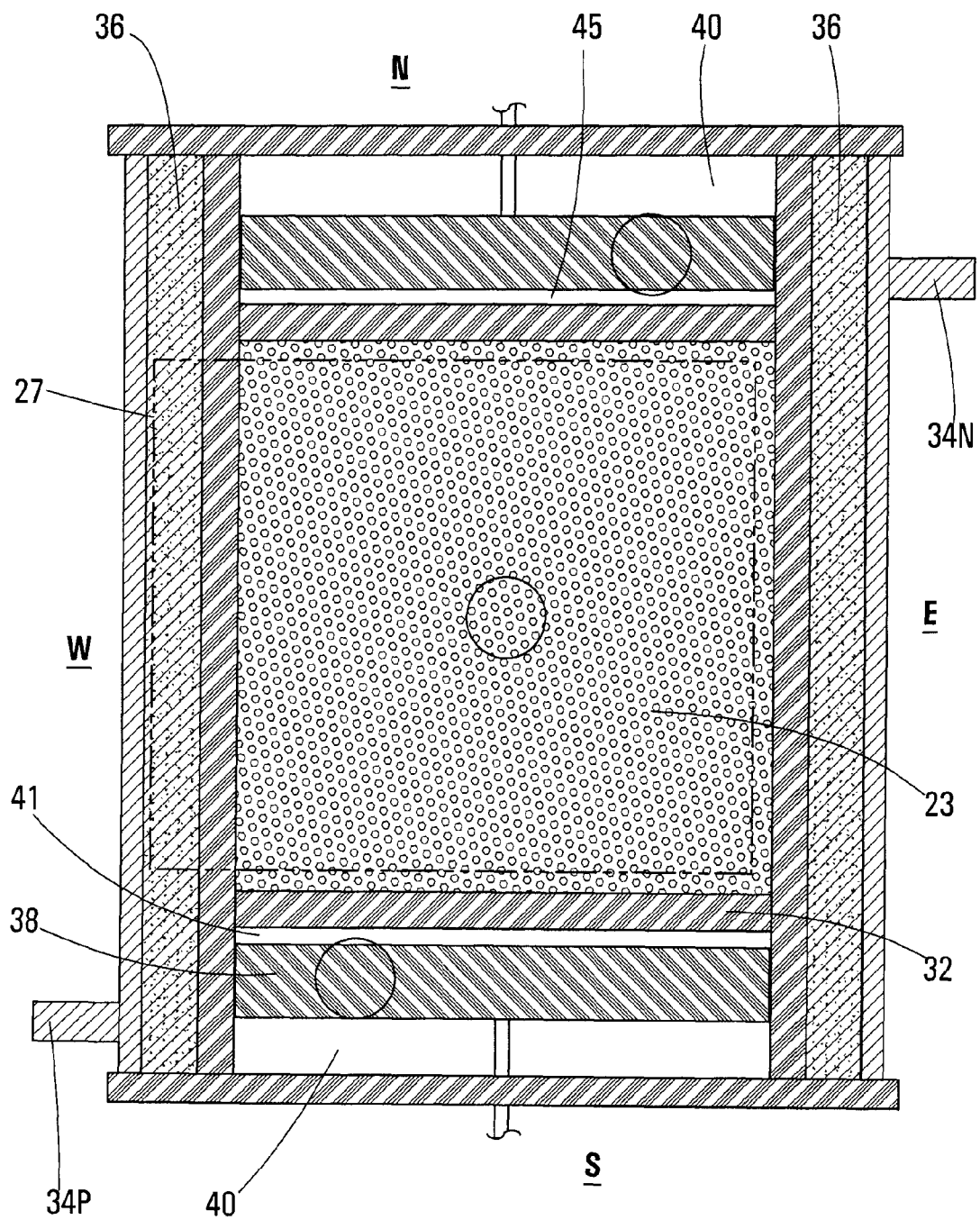
FIG. 3 is a plan view of the apparatus, with a lid of the housing removed.

FIG. 3 shows a plan view of the apparatus. In FIG. 3, the lid of the housing has been removed, so that the topmost spacer 23 is visible. The dashed lines in FIG. 3 represent the outline of one of the anode current-collectors 27A, which protrudes from the west edge of its anode.

Figure 4:
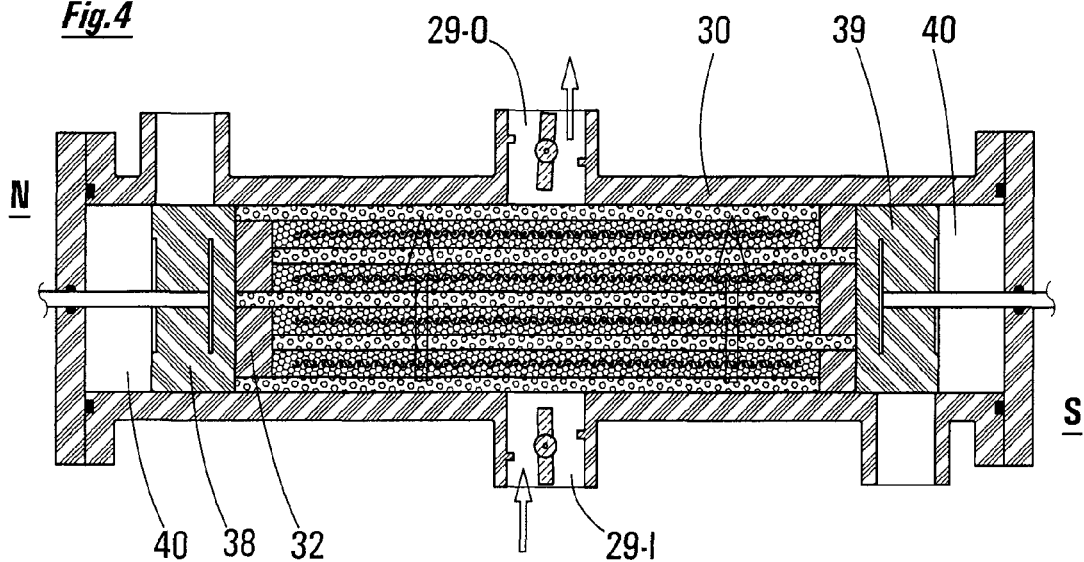
FIG. 4 is a north-south cross-sectional view of the apparatus, operating in the treatment-phase.

FIG. 4 shows a north-south view of the apparatus. Again, the edges of all the electrodes and spacers are sealed or blocked in such manner that there is no pathway whereby the seawater could or might bypass any of the electrodes.

The anode current-collectors 27A protrude from the west edges of the anodes and the cathode current-collectors 27C protrude from the east edges of the cathodes. The current-collectors pass through, but are embedded in, the potted sealant 32. Electricity is fed into the treatment apparatus from a power supply unit, which includes a positive terminal 34P and a negative terminal 34N. Blocks of graphite 36 convey the current between the terminals 34 and the appropriate current-collectors 27. Typically, charging the capacitor plates (i.e the electrodes 21) involves a maximum current in the electrode of 40 amps/sq.metre. (The current drops off as the plates become fully charged.)

The seawater passes through the first spacer 23F and then the first electrode 21F. The seawater then passes all the way through the stack, passing thickness-wise through the thicknesses of all the electrodes 21 and all the spacers 23. The spacers serve as intermediate plenums; thus, if one of the electrodes might have a local patch in which the permeability of the electrode is less or more than the surroundings, any differences in flow would be evened out as the seawater passes through the next spacer.

The electrodes are charged to a voltage of, typically, 1.3 volts. This is large enough to create a capacitive effect between an adjacent anode-cathode pair that is effective to draw ions out of the seawater by capacitive electrostatic attraction. The ions are sorbed into the pores of the activated-carbon material of the capacitor plates. More ions are sorbed out of the seawater as the seawater progresses through the stack. Each anode-cathode (and cathode-anode) pair serves as a further capacitive cell, for drawing ions out of the water.

The voltage applied to the cells should not be more than about 1½ volts (depending on the contents of the water) because, at higher voltages, electrolysis of the components dissolved in the seawater might occur. At that, the amount of electrical energy required to adsorb the ions out of the seawater is minimal. Often, the salts are not contaminants, and can be discarded in their still-intact state. Thus, desalination of seawater (and deionization of other types of salts-laden water) can be very economical when done by CDI techniques.

As the ions are removed from the passing seawater, the pores of the electrodes become filled with adsorbed ions. The current passing through the electrodes, and the voltage level to which the plates are charged, depends on the degree to which the pores are filled with adsorbed ions. The electrodes only reach their full state of charge when the pores are filled. Thus, when the electrodes are clean, the voltage is low and the current is high. Then, as the pores are filled, the voltage rises to its fully-charged level, and the current drops to zero.

The permeability of the electrodes decreases as the pores become filled, but not so much as to block flow—i.e once the pores of one electrode-pair are filled, the flow of seawater continues, but ions are no longer being removed by that pair.

When all the pores in the electrodes are filled with ions, and the current has dropped to the predetermined level, the flow of seawater is discontinued. This is done by closing the valves in the seawater inlet and outlet ports 29-I,29-O. Now, the electrodes have to be purged of ions. The apparatus is switched over to the purge-phase. In the purge-phase, purge-water is flushed through the electrodes 21.

Preferably, during the purge-phase, the anodes and cathodes are all shorted together electrically. Upon shorting, there is a spike of current (in the reverse direction) as the capacitors start to discharge. Purging is completed when the discharge-current drops to zero.

When purging, alternatively, electricity can be supplied to the cells, but in reverse, i.e the polarity of the capacitor plates is reversed, i.e the anodes become cathodes and the cathodes become anodes.

Figure 5:
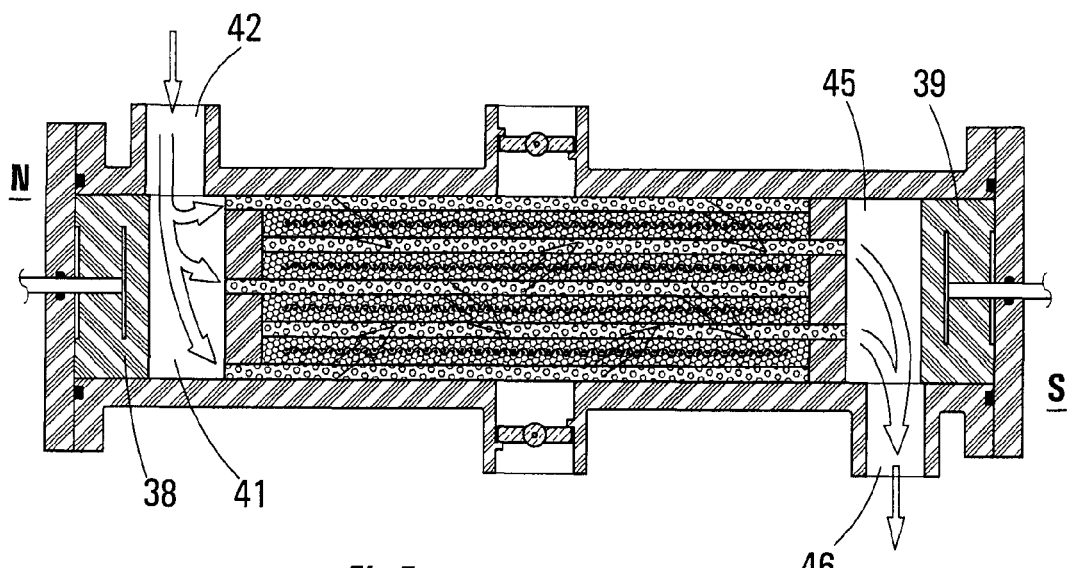
FIG. 5 is the same view as FIG. 4, but shows the apparatus operating in the purge-phase.

In the purge-phase, the ions are released (or repelled) from the electrodes, and enter the purge-water. FIG. 5 shows how the purge-water flows through the stack of electrodes and spacers during the purge-phase.

In FIG. 5, there is no flow of purge-water, in the stack, in the thickness-wise through-the-thickness direction. Instead, the purge-flow enters the north-edges of the spacers, and leaves through the south-edges, passing along the spacers from north to south in the direction parallel to the planes of the electrodes and spacers.

The designers might have arranged that the purge-water simply flows along the spacers, from north to south, and the ions enter the purge-water simply by diffusion, from the electrodes. However, diffusion is rather inefficient, as an extraction mechanism, and there is an effective, but simple, alternative as is shown in FIG. 5.

The apparatus includes a movable purge-inlet-member 38 to the north of the stack and a movable purge-outlet-member 39 to the south. In FIG. 4, these members are shown in position to block and seal the edges of the spacers and the electrodes, as is required during the treatment-phase. Pressure should be maintained in actuation-chambers 40 during the treatment-phase, to maintain the edge seals.

In FIG. 5, the members 38,39 are withdrawn from the north and south sides of the stack 5, thereby opening the edges of the spacers to a purge-inlet-plenum 41 and purge-inlet-port 42 to the north, and to a purge-outlet-plenum 45 and purge-outlet-port 46 to the south. In FIG. 3, the members 38,39 are shown in intermediate positions.

As mentioned, the spacers 23 are intercalated or interleaved with the electrodes 21, in a spacer-anode-spacer-cathode-spacer-anode-spacer-cathode-spacer configuration. In FIG. 4 and FIG. 5 it can be seen that the spacers themselves are also in an alternating relationship.

Thus, one of the spacers is open to the purge-inlet plenum 41 to the north but is closed to the purge-outlet-plenum 45 to the south, while the next adjacent spacers, either side, are both open to the purge-outlet-plenum 45 to the south, while being closed to the purge-inlet plenum 41 to the north. It will be understood that this alternating relationship of the spacers is repeated through the whole stack. The spacers that are open to the purge-inlet-plenum 41 are termed in-spacers, and the spacers that are open to the purge-outlet-plenum 45 are termed out-spacers.

This alternating-spacers arrangement was of no consequence during the treatment-phase, but it is important during the purge-phase. The effect of the alternating relationship of the spacers is, in the purge-phase, that the purge-water cannot simply flow lengthwise along just one spacer, picking up ions solely by diffusion.

Rather, the purge-water, having passed into one of the in-spacers, now has to pass thickness-wise through the thickness of the intervening electrode, in order to reach the next adjacent one of the out-spacers, and thus to exit from the apparatus. (In fact, as shown by the arrows in FIG. 5, the purge-water from one in-spacer passes into both of the adjacent out-spacers—and each out-spacer receives purge-water that has passed through both of the adjacent in-spacers.) Thus, because of the alternating-spacers arrangement, now the moving purge-water acts to physically flush the ions from the electrodes. Physical flushing is considerably more efficacious a process than diffusion, for snagging the ions out of the pores.

Again, the spacers are considerably more permeable than the electrodes; therefore, if the purge-water is permitted to pass straight along the spacers, it will do so, whereby flow through the thicknesses of the electrodes will be minimal. By closing off the south-edges of the in-spacers and the north-edges of the out-spacers, as described, the purge-water is forced to move into the electrodes, and to pass thickness-wise through the thickness of the electrodes.

In short, for taking the ions out of the seawater, in the treatment-phase, the waterways of the apparatus were set (FIG. 4) for conducting the seawater thickness-wise through the whole stack of electrodes and spacers, so that the water passes through each of the many CDI cells, one after the other, in series. By contrast, in the purge-phase, the waterways of the apparatus are set (FIG. 5) so that the purge-water travels thickness-wise through just one or two of the electrodes.

The purge-water can be pure water, but often it is satisfactory to use the available saltwater as the purge-water.

In some CDI apparatuses, the thin sheets of the electrodes and the thin sheets of the spacers are wound spirally, or are in some format other than flat. In that case, the north, south, etc, designations still apply, but now they apply to the sheets when (notionally) laid out flat.

The rectangular shape of the spacers and electrodes is preferred, in that the distance the purge-water has to travel, from the inlet-plenum (north) to the outlet-plenum (south) is the same for all spacers, and for all locations within the spacers. If the shapes of the spacers and electrodes need to differ from each other, and/or to be of different shapes from each other, the designers should see to it that the purge-water flowpath distances between any point on the north-edge of the electrode or spacer to the nearest point on the south-edge of the electrode or spacer, are of similar length, in that the difference between the shortest and longest purge-water flowpaths should be less than twenty percent of the longest flowpath.

Some of the components and features in the drawings have been given numerals with letter suffixes, which indicate left/right, anode/cathode, etc, versions of the components. The numeral without the suffix has been used herein to indicate the components generically.

Terms of orientation (e.g "up/down", "north/south", and the like) when used herein are intended to be construed as follows. The terms being applied to a device, that device is distinguished by the terms of orientation only if there is not one single orientation into which the device, or an image (including a mirror image) of the device, could be placed, in which the terms could be applied consistently.

The scope of the patent protection sought herein is defined by the accompanying claims. The apparatuses and procedures shown in the accompanying drawings and described herein are examples.

THE REFERENCE NUMERALS USED IN THE DRAWINGS ARE 21,21A,21C,21F electrodes
23,23F spacers
25 stack of electrodes and spacers 27,27A,27C current collectors
29-I,29-O seawater inlet and outlet ports
30 housing
32 potted sealant
34P,34N power-unit terminals
36 graphite blocks
38 purge-inlet-member
39 purge-outlet-member
40 actuation chambers
41 purge-inlet-plenum
42 purge-inlet-port
45 purge-outlet-plenum
46 purge-outlet-port.

The invention claimed is:

1. A water treatment apparatus, which is arranged for capacitive deionization of a liquid, wherein:
the apparatus includes electrodes, each electrode being:
(a) a thin sheet of a porous, high-surface-area, material;
(b) permeable to water flowing thickness-wise through the thickness of the electrode;
the apparatus includes spacers, each spacer being:
(a) electrically insulative;
(b) permeable to water flowing thickness-wise through the thickness of the spacer;
the spacers lie intercalated between adjacent electrodes, to form a stack of electrodes and spacers;
the apparatus also includes:
(a) a power unit for supplying electrical energy to the electrodes;
(b) a treatment-inlet-port, through which water to be treated enters the apparatus;
(c) a treatment-outlet-port, through which treated water exits the apparatus;
(d) a purge-inlet-port, through which purge-water enters the apparatus;
(e) a purge-outlet-port, through which purge-water exits the apparatus;
(f) waterways for conveying treatment-water from the treatment-inlet-port, through the stack, to the treatment-outlet-port;
(g) waterways for conveying purge-water from the purge-inlet-port, through the stack, to the purge-outlet-port;
the apparatus is so structured and arranged as to be operable in a treatment-phase and in a regeneration-phase, and is switchable between the two phases;
in the treatment-phase, the power unit is so configured that:
(a) the power unit supplies electricity to the electrodes in such manner as to create pairs of anodes and cathodes;
(b) the capacitive deionization function arises, in that ions are electrostatically attracted out of the treatment-water and are sorbed into the pores of the electrodes;
in the treatment-phase, the waterways are so configured that:
(a) there is no liquid-flow-communication through the stack, between the purge-inlet-port and the purge-outlet-port;
(b) there is no liquid-flow-communication between adjacent spacers, other than thickness-wise through the thickness of the intervening electrode;
(c) treatment-water enters the apparatus through the treatment-inlet-port;
(d) the treatment-water passes through the stack thickness-wise through the thicknesses of the electrodes and spacers;
(e) the treatment-water passes through the stack, spacer-anode-spacer-cathode-spacer-anode-spacer-cathode-spacer, and so on, thickness-wise through the thicknesses of the electrodes and thickness-wise through the thicknesses of the intercalated spacers, in series, through the stack;
(f) the treatment-water exits through the treatment-outlet-port;
in the purge-phase, the power-unit is so configured that:
the sorbed ions are no longer electrostatically attracted to the electrodes;
in the purge-phase, the waterways are so configured that:
(a) there is no liquid-flow-communication, through the stack, between the treatment-inlet-port and the treatment-outlet-port;
(b) north-edges of the spacers are in liquid-flow-communication with the purge-inlet-port;
(c) south-edges of the spacers are in liquid-flow-communication with the purge-outlet-port;
(d) whereby the purge-water passes through the spacers of the stack, in the direction parallel to the planes of the spacers, from the purge-inlet-port to the purge-outlet-port.

2. As in claim 1, wherein, in the treatment-phase:
the power supply is connected to the electrodes to form anode-cathode pairs;
in respect of each pair:
(a) capacitive-areas of the two electrodes lie in such close-spaced face-to-face overlapping relationship as to create a capacitive function, and to create the capacitive deionization (CDI) in that pair;
(b) the capacitive-areas of the pair define a perimeter and a thickness of the capacitive-space of that pair;
(c) the capacitive-space is defined as to its thickness by the face-to-face separation distance of the pair of electrodes, which is defined by the thickness of the spacer therebetween;
(d) the capacitive-space is defined as to its perimeter in that, outside the perimeter of the capacitive-space, the electrodes are either curtailed, or the face-to-face separation distance between the electrodes is too large to support substantive capacitive function;
(e) the power supply is operable to convey electrical energy to the electrodes at a voltage that is:
(i) high enough to create a substantive capacitive effect between the electrodes;
(ii) high enough to remove ions from the water by electrostatic attraction, whereby the ions become sorbed into the electrodes; and
(iii) low enough to avoid creating electrolytic redox reactions in water passing through the pair.

3. As in claim 1, wherein:
in the purge-phase, the waterways are so configured that:
(a) some of the spacers are termed in-spacers and the others are termed out-spacers;
(b) the north-edges of the in-spacers are in liquid-flow-communication with the purge-inlet-port;
(c) the south-edges of the out-spacers are in liquid-flow-communication with the purge-outlet-port;
(d) in respect of each in-spacer, purge-water entering the north-edge of that in-spacer cannot pass out of that in-spacer other than by passing:
(i) thickness-wise through the thickness of the adjacent electrode in the stack; then
(ii) lengthwise along the adjacent out-spacer; then
(iii) out of the out-spacer through the south-edge thereof, and out through the purge-outlet-port;
(e) in respect of each out-spacer, purge-water exiting the south-edge of that out-spacer cannot have entered that out-spacer other than by having passed:

(i) thickness-wise through the thickness of the adjacent electrode in the stack; and before that
(ii) lengthwise along the adjacent in-spacer, and before that
(iii) into the in-spacer through the north-edge thereof, from the purge-inlet-port.

4. As in claim 3, wherein, in the purge-phase:
the apparatus includes a purge-inlet-plenum, which is so structured and arranged, between the purge-inlet-port and the stack of electrodes and spacers, that purge-water cannot pass from the purge-inlet-port to the stack except through the purge-inlet-plenum;
the purge-inlet-plenum is so configured that, within the plenum, substantially no differences or gradients of pressure head can exist;
the north-edges of all the in-spacers of the stack are in liquid-flow-communication with the purge-inlet-plenum;
there is no liquid-flow-communication between the purge-inlet-plenum and the south-edge, the east-edge, or the west-edge of the inlet-spacer.

5. As in claim 4, wherein, in the purge-phase:
the apparatus includes a purge-outlet-plenum, which is so structured and arranged, between the stack of electrodes and spacers and the purge-outlet-port, that purge-water cannot pass from the stack into the purge-outlet-port except through the purge-outlet-plenum;
the purge-outlet-plenum is so configured that, within the plenum, substantially no differences or gradients of pressure head can exist;
the south-edges of all the out-spacers of the stack are in liquid-flow-communication with the purge-outlet-plenum;
there is no liquid-flow-communication between the purge-outlet-plenum and the north-edge, or the side-edges, of the inlet-spacer.

6. As in claim 5, wherein:
the apparatus includes a movable purge-inlet-member and a movable purge-outlet-member;
in the treatment-phase, the waterways are so configured that:
(a) the purge-inlet-member blocks liquid-flow-communication between the purge-inlet-plenum and all of the spacers; and
(b) the purge-outlet-member blocks liquid-flow-communication between the purge-outlet-plenum and all of the spacers;
in the purge-phase, the waterways are so configured that:
(a) the purge-inlet-member opens liquid-flow-communication between the purge-inlet-plenum and the north-edges of all the in-spacers; and
(b) the purge-outlet-member opens liquid-flow-communication between the purge-outlet-plenum and the south-edges of all the out-spacers.

7. As in claim 5, wherein:
in the treatment-phase, the waterways are so configured that:
all the edges of all the spacers in the stack have no liquid-flow-communication, in or out;
in the purge-phase, the waterways are so configured that:
the in-spacers are in liquid-flow-communication with the purge-inlet-plenum;
the south- and side-edges of the in-spacers have no liquid-flow-communication, in or out;
the out-spacers are in liquid-flow-communication with the purge-outlet-plenum; and
the north- and side-edges of the out-spacers have no liquid-flow-communication, in or out.

8. As in claim 5, wherein:
the apparatus includes a treatment-inlet-plenum, which is so structured and arranged, between the treatment-inlet-port and the stack of electrodes and spacers, that treatment-water cannot pass from the treatment-inlet-port to the stack except through the treatment-inlet-plenum;
the treatment-inlet-plenum is so configured that, within the plenum, substantially no differences or gradients of pressure head can exist;
the apparatus includes a treatment-outlet-plenum, which is so structured and arranged, between the stack of electrodes and spacers and the treatment-outlet-port, that treatment-water cannot pass from the stack to the treatment-outlet-port except through the treatment-outlet-plenum;
the treatment-inlet-plenum is so configured that, within the plenum, substantially no differences or gradients of pressure head can exist;
in the treatment-phase, the waterways are so configured that:
(a) substantially the whole area of the capacitor-space of a first electrode of the stack is in liquid-flow-communication with the treatment-inlet-plenum; and
(b) substantially the whole area of the capacitor-space of a last electrode of the stack is in liquid-flow-communication with the treatment-outlet-plenum.

9. As in claim 1, wherein:
in the purge-phase, the waterways are so configured that, in respect of each electrode, there is no liquid-flow-communication, in or out, through the side-edges of the electrode.

10. As in claim 1, wherein
in the purge-phase, the power-unit is so configured that:
the anodes and cathodes are electrically-shorted.

11. As in claim 1, wherein the salt-content of the treated-water exiting the apparatus is no more than ten percent of the salt-content of the to-be-treated water entering the apparatus.

12. As in claim 1, wherein:
the apparatus includes a supply-reservoir of the brine to be treated;
the purge-water entering the purge-inlet-port is brine supplied from the same supply-reservoir;
the salt-content of purge-water exiting the purge-outlet-port is five times the salt-content of the purge-water entering the purge-inlet-port, or more.

13. As in claim 1, wherein, in the treatment-phase, the power-unit is configured for monopolarity of the electrodes, in that:
in respect of each anode, the next electrode immediately upstream, in the stack, is a cathode and the next electrode immediately downstream is a cathode; and
in respect of each cathode, the next electrode immediately upstream, in the stack, is an anode and the next electrode immediately downstream is an anode.

14. Procedure for purifying ionized water, including:
providing an apparatus that embodies claim 1;
operating the apparatus in the treatment-phase, and operating the apparatus in the purge-phase, one after the other, in a repeating cycle.

* * * * *